Aug. 19, 1969   J. R. POLSTON   3,461,904
GATE VALVE
Filed Aug. 10, 1967   2 Sheets-Sheet 1
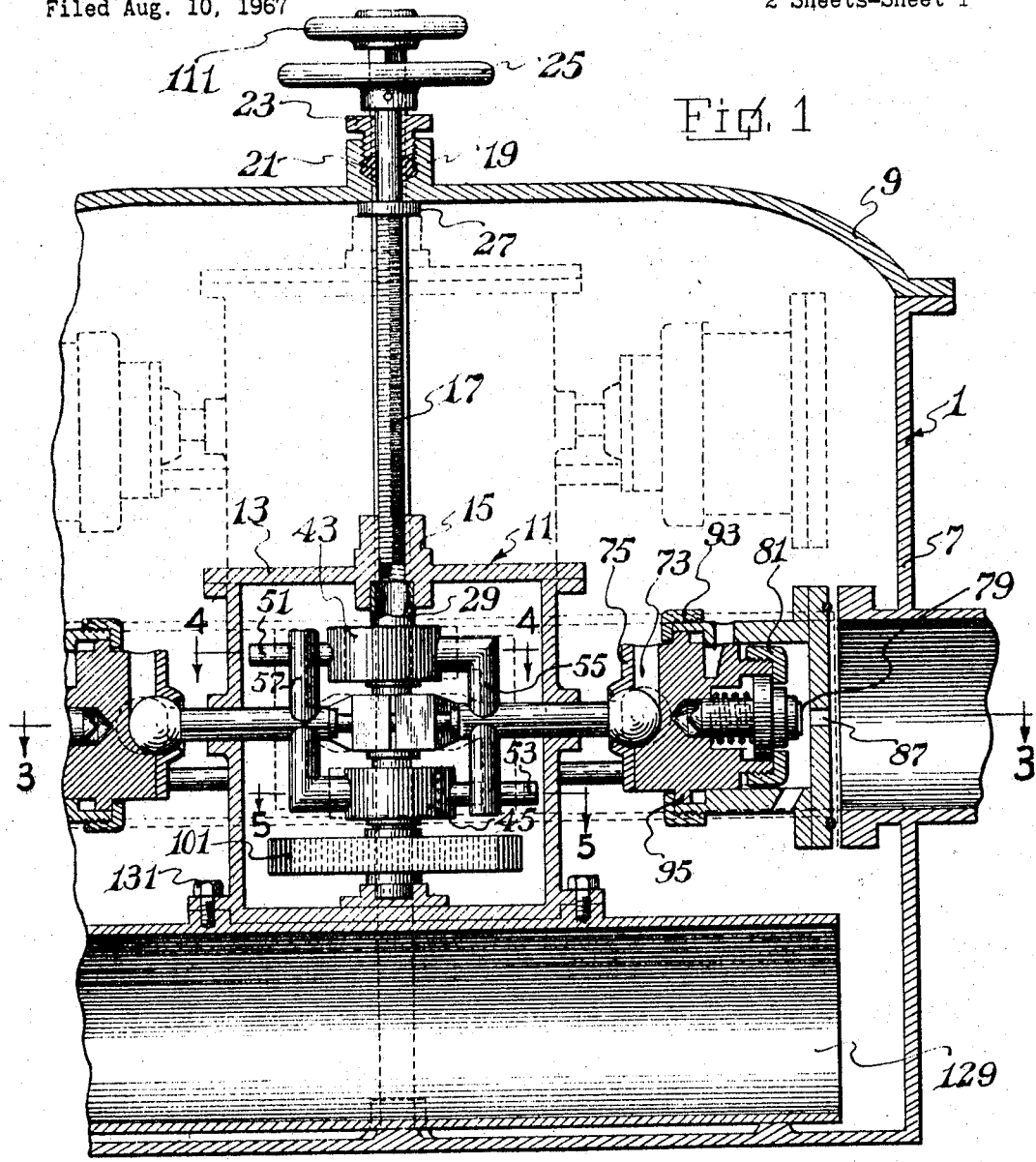
Fig. 1
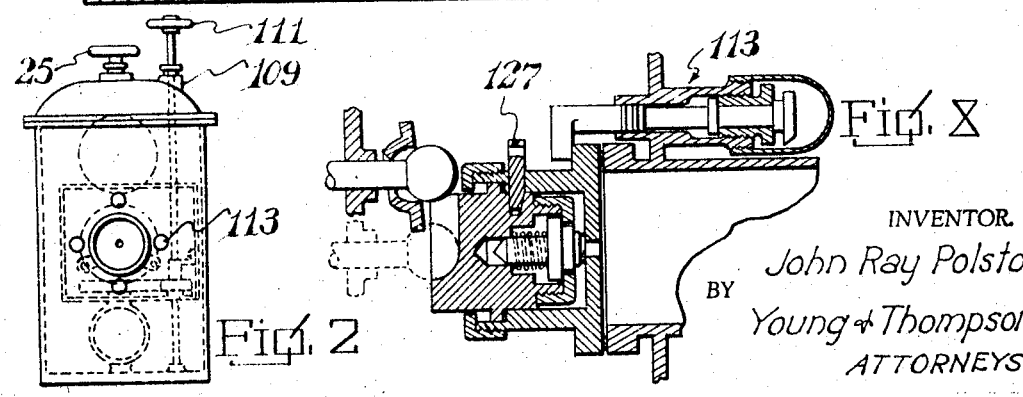
Fig. 2   Fig. X
INVENTOR.
John Ray Polston
BY Young & Thompson
ATTORNEYS Aug. 19, 1969  J. R. POLSTON  3,461,904
GATE VALVE
Filed Aug. 10, 1967  2 Sheets-Sheet 2
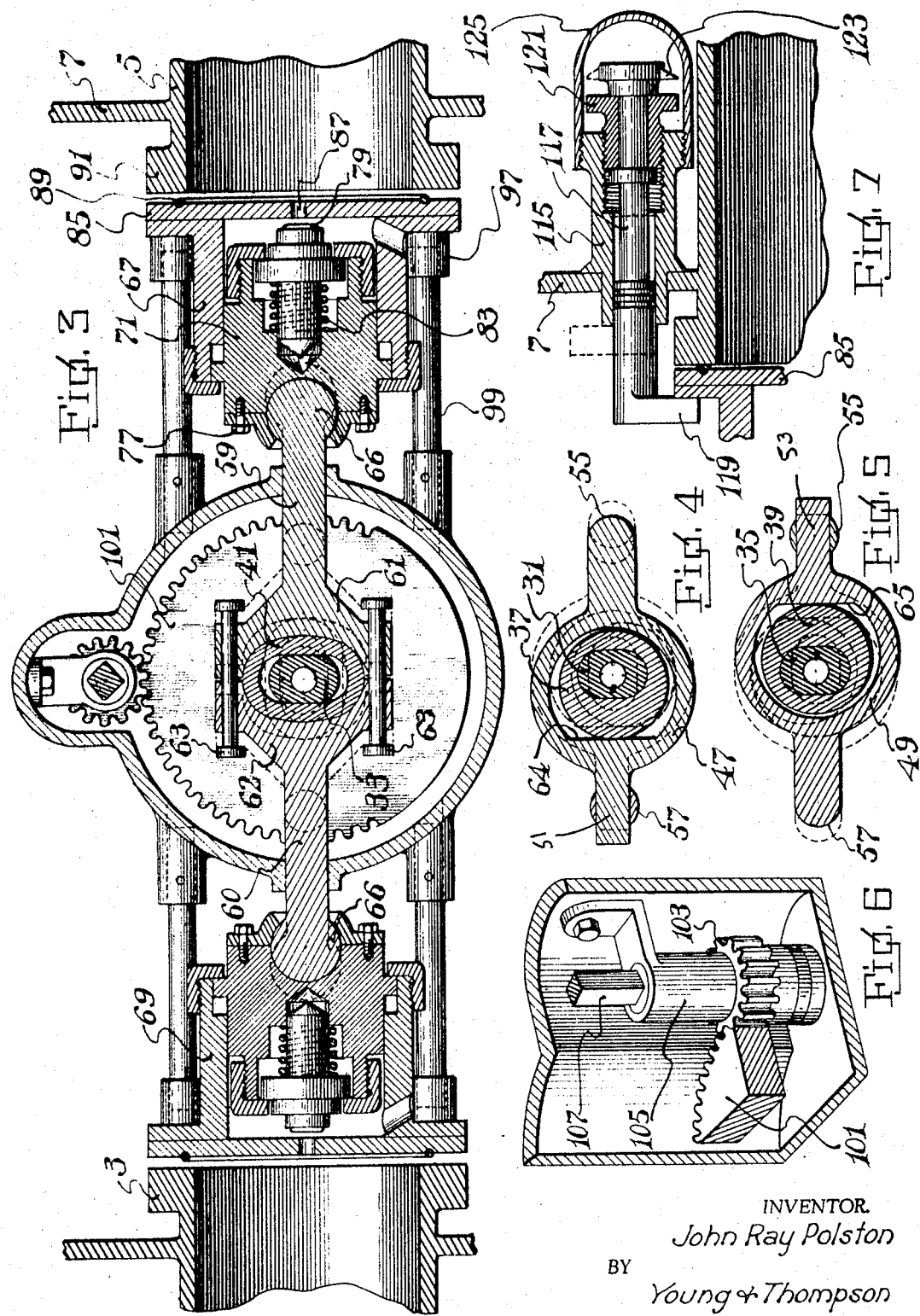
INVENTOR.
John Ray Polston
BY
Young & Thompson
ATTORNEYS

United States Patent Office 3,461,904
Patented Aug. 19, 1969

3,461,904
GATE VALVE
John Ray Polston, 3346 S. Wheeling Ave.,
Tulsa, Okla. 74105
Filed Aug. 10, 1967, Ser. No. 659,755
Int. Cl. F16k *51/00, 3/18*
U.S. Cl. 137—315  10 Claims

ABSTRACT OF THE DISCLOSURE

A bifaced gate valve is particularly suitable for use in pipelines and comprises a valve mechanism that slides vertically on and relative to a squared valve stem, between a closed position in line with the pipeline and an open position in which the mechanism is out of line with the pipeline but a through conduit is in line with the pipeline. Special cam assemblies ensure equal and opposite seating of the valve faces on the seats. Special structure makes the valve easy to disassemble.

---

The present invention relates to gate valves, more particularly of the bifaced type suitable for use in pipelines.

It is an object of the present invention to provide a gate valve having an improved valve actuating mechanism.

Another object of the present invention is to provide a bifaced gate valve whose valve faces automatically seat with equal force in opposite directions.

It is also an object of the present invention to provide a gate valve that requires reduced effort for opening and closing and which imposes less strain on the valve actuating mechanism.

Still another object of the present invention is the provision of a gate valve having a novel pilot valve for sequential valve opening and closing.

The invention also provides a bifaced gate valve of unique structure such that it can be readily assembled and disassembled and such that one valve head or the other may be selectively removed.

Finally, it is an object of the present invention to provide a gate valve which will be relatively simple and inexpensive to manufacture, easy to assemble, install, operate, maintain and repair, and rugged and durable in use.

Other objects and advantages of the present invention will become apparent from a consideration of the following description, taken in connection with the accompanying drawings, in which:

FIGURE 1 is a vertical sectional view of a bifaced gate valve according to the present invention;

FIGURE 2 is a reduced end elevational view of a valve according to the invention;

FIGURE 3 is a cross-sectional view taken on the line 3—3 of FIG. 1;

FIGURE 4 is a view taken on the line 4—4 of FIG. 1;

FIGURE 5 is a view taken on the line 5—5 of FIG. 1;

FIGURE 6 is an enlarged fragmentary perspective view of a portion of the actuating mechanism;

FIGURE 7 is a fragmentary cross-sectional view showing selective locking mechanism according to the invention; and FIGURE 8 is a fragmentary cross-sectional view showing the mechanism of FIG. 7 in use.

Referring now to the drawings in greater detail, there is shown a valve according to the present invention comprising a casing 1 and formed integrally therewith a valve inlet 3 and a valve outlet 5 which are in line with each other and are adapted for insertion in a pipeline. Casing 1 includes a main body 7 in the form of a protective receptacle through the side walls of which the inlet 3 and the outlet 5 extend, and a cover 9 which is removably secured to body 7 to provide access to the valve mechanism.

Removably mounted in casing 1 is the valve actuating assembly 11, the principal portions of which are disposed within a housing 13. The cover of housing 13 carries an upright central sleeve 15 integral therewith, which is internally screw-threaded for the reception of an upright rotatable drive screw 17 that extends at its upper end through an upright sleeve 19 integral with cover 9. Packing 21 and a gland nut 23 releasably secure drive screw 17 in sealed relationship in casing 1. Screw 17 is rotatable by means of a handwheel 25 and is fixed against axial movement between handwheel 25 and a flange 27 integral with screw 17.

A hollow shaft 29 is mounted for rotation in the upper and lower walls of housing 13 and has three oval portions 31, 33 and 35 fixedly secured thereto. Eccentric cams 37 and 39, out of phase with each other by 180°, are fixedly secured to oval portions 31 and 35, respectively. A floating hollow cam 41, in the form of an oval sleeve, is slidably disposed on oval portion 33 for movement relative to oval portion 33 only parallel to the elongated dimension thereof. For this purpose, the recess in floating hollow cam 41 is of substantially greater length than the greatest dimension of oval portion 33.

A pair of valve actuators 43 and 45 are provided, which are substantially inverted mirror images of each other. Valve actuators 43 and 45 include hollow sleeves 47 and 49, respectively, to which are secured horizontal shafts 51 and 53, respectively, that extend in opposite directions from each other. Secured to continuations of horizontal shafts 51 and 53, on the opposite sides of hollow sleeves 47 and 49 therefrom, are vertical shafts 55 and 57, respectively, which extend vertically in opposite directions from each other. Thus, shaft 55 extends down and shaft 57 extends up. Shaft 51 is slidably disposed in a hole through the upper end of shaft 57. Shaft 53 is slidably disposed in a hole through the lower end of shaft 55. A horizontal outwardly extending arm 59 is carried by vertical shaft 55, while a horizontal outwardly extending arm 60 is carried by shaft 57. Arm 59 terminates inwardly in a half sleeve 61 which encompasses and conforms to the outer contour of half of floating hollow cam 41 in the position of FIG. 3, while arm 60 terminates inwardly in a half sleeve 62 which encompasses and conforms to the outer contour of the other half of floating hollow cam 41. Headed bolts 63 pass through and interconnect sleeves 61 and 62 and maintain them in the desired alignment relative to each other and also limit their movement apart from each other.

The hollow sleeves 47 and 49 are disposed at the level of and surround eccentric cams 37 and 39, respectively, and are thus disposed respectively above and below the sleeves 61 and 62 and their enclosed cam 41 and oval portion 33. The recess within hollow sleeves 47 and 49 are substantially larger than their enclosed eccentric cams 37 and 39; but those recesses are bounded internally in part by cam surfaces 64 and 65, respectively, against which eccentric cams 37 and 39 slide in order to move the valve toward open position, as will be explained later.

Horizontal arms 59 and 60 extend slidably through the side walls of housing 13 and terminate outwardly in balls 66, which in turn are the male members of universal joints formed in valve heads 67 and 69. As the valve heads 67 and 69 are identical to each other, only one of them will be described hereinafter, the description of one serving for both.

Each of the valve heads 67 and 69 comprises a central assembly 71 that provides a socket 73 for the associated ball 66, which in turn is retained by a ball cap 75.

The socket 73 opens upwardly, to permit disassembly of the socketed parts in that direction. Each ball cap 75 is removably held in place on its central assembly 71 by means of screws 77.

At its outer side, each central assembly 71 carries a pilot valve 79 which is retained in its most extended position by means of a retainer nut 81, toward which it is urged by a coil compression spring 83. A valve disc 85 is movable on and relative to central assembly 71, and has a central or axial relief orifice 87 which is aligned with and selectively closed by pilot valve 79. A sealing ring 89 about the periphery of disc 85 selectively bears against and seals with a valve seat 91 formed on inlet 3 or outlet 5. A retainer nut 93 on the rear of disc 85 retains central assembly 71 within valve disc 85 with opportunity for substantial relative movement between disc 85 and assembly 71, a flange 95 on central assembly 71 determining the forwardmost and rearmost positions of assembly 71 within disc 85. Disc 85 also carries horizontal sockets 97 in which the outer ends of guide rods 99 are slidably received, for guiding the valve heads in coaxial movement, the inner ends of guide rods 99 being removably secured to housing 13.

Hollow shaft 29, and with it the oval portions 31–35, is rotated by means of a gear 101 fixed to its lower end and meshing with a drive pinion 103. Pinion 103, in turn, is fixed against axial movement relative to housing 13 by means of a bracket 105 within which pinion 103 is rotatable, and which in turn is secured to a side wall of housing 13, as best seen in FIG. 6.

A very important feature of the invention is that pinion 103 is vertically slidable on, but not rotatable relative to, the valve stem in the form of a squared shaft 107 which is journaled for rotation adjacent its upper and lower ends in housing 1. Like screw 17, squared shaft 107 passes upwardly out of cover 9 through a sleeve 109 and carries at its upper end a handwheel 111 by which it may be turned. However, shaft 107 is fixed against axial movement.

Locks 113 are provided for selectively securing the valve heads 67 and 69 in closed relationship with their respective outlet 5 and inlet 3, so that the rest of the mechanism may be removed or replaced or repaired. Each lock 113 comprises a sleeve 115 carried by and extending through a side wall of main body 7 of casing 1. A shaft 117 is disposed rotatably and axially slidably in sealed relationship in each sleeve 115. Shaft 117 carries at its inner end a radially outwardly extending lug 119 and at its outer end carries a nut 121 rotatable on shaft 117 but fixed between flanges against axial movement relative to shaft 117. Nut 121 is screw-threadedly disposed within sleeve 115. Thus, manipulation of nut 121 moves nut 121 and with it the shaft 117 axially within sleeve 115. Manipulation of the outer end of shaft 117 permits lug 119 to be revolved, to an extent and to a position indicated by an indicator 123 on the outer end of shaft 117. A cap 125 is screw-threadedly disposed over the outer end of sleeve 115 and protects shaft 117 and nut 121 and indicator 123 against becoming fouled with dirt. In the locked position of the parts shown in FIG. 8, a removable peg 127 extends through valve disc 85 and into central assembly 71 releasably to maintain the inlet 3 or outlet 5 closed while an operation is performed on some other part of the structure.

The gate valve of the present invention is the type in which the structure is raised when the valve is open and is lowered when the valve is closed. In the position of FIG. 1, the valve is in the process of being opened or closed, but it is not in the raised position that it occupies when open and in use. Accordingly, there is provided a through conduit 129 which when raised extends between and is disposed at its ends closely adjacent the inlet 3 and outlet 5, and which is detachably secured to the underside of housing 13 by means of screws 131. The position of the valve when open and in use is accordingly shown in FIG. 1 in phantom line.

Starting with the position of FIG. 1, the handwheel 25 is turned to rotate the drive screw 17, which in turn raises or lowers the assembly 11 as a whole, the screw 17 extending down into hollow shaft 29 in the raised position shown in phantom line in FIG. 1. In that raised position, the through conduit 129 will be in line with the inlet 3 and the outlet 5, to prevent turbulence during flow of liquid through the valve. However, if FIG. 1 is considered to be the position of the parts just prior to closing the valve, then handwheel 25 is not touched; instead, handwheel 111 is turned, which turns squared shaft 107 and actuates pinion 103 to rotate gear 101. Gear 101 is fixed to hollow shaft 29 and hence causes the oval portions 31–35 to turn. The turning of oval portions 31 and 35 releases the eccentric cams 37 and 39 from contact with the cam surfaces 64 and 65, thereby freeing the valve actuators 43 and 45 for movement away from each other toward a closed valve position. The oval portion 33, in turn, rotates and causes floating hollow cam 41 to rotate through the same angle. Cam 41 bears against the interior of half sleeves 61 and 62, forcing them apart and hence forcing valve actuators 43 and 45 apart. The central assemblies 71 of valve heads 67 and 69 are thus forced apart.

The outward movement of central assembly 71 takes place in two stages. In the first stage, flange 95 has lost motion within valve disc 85, until pilot valve 79 closes relief orifice 87. Thereafter, with pilot valve 79 bearing against valve disc 85 and flange 95 bearing against valve disc 85, continued outward movement of central assembly 71 will force valve disc 85 into sealing contact with the associated valve seat 91.

During this movement, it will be noted that floating hollow cam 41 is free to shift along its major axis relative to oval portion 33. Oval portion 33 cannot shift on hollow shaft 29, but a measure of lost motion is nevertheless provided between portion 33 and cam 41. It will thus ensue that both valve discs will press against their respective valve seats with equal and opposite forces. Meanwhile, the sliding interconnection of vertical shafts 55 and 57 with horizontal shafts 53 and 51, respectively, ensures a guided motion of valve actuators 43 and 45 relative to each other; while the ball-and-socket connection at 66, 73, between the valve actuators and the valve heads, permits the parts to assume an equilibrium position when the valve is closed.

To open the valve, handwheel 111 is turned in the opposite direction. The valve opens stepwise. The oval portion 33 and floating hollow cam 41 turn from their phantom line position of FIG. 3 toward their full line position of FIG. 3. This has no valve opening effect, but merely releases the valve actuators 43 and 45 so that they can be moved toward each other. Instead, the valve opening movement is effected by the eccentric cams 37 and 39, which now move onto their respective cam surfaces 64 and 65 and press valve actuator 43 to the left as seen in FIGS. 1 and 4 and press valve actuator 43 to the right as seen in FIGS. 1 and 5. Central assemblies 71 move toward each other, which results first in the opening of the pilot valve 79. The pressure on opposite sides of the inlet 3 and the outlet 5 is thus quickly equalized, so that the valve discs 85 can open easily. When flange 95 of central assembly 71 contacts the retainer nut 93, the second stage of valve opening movement takes place, in which the valve disc 85 is drawn away from the associated valve seat 91. The handwheel 25 can then be turned to raise the assembly 11 until through conduit 129 is aligned with the inlet 3 and the outlet 5.

When it is desired to set into casing 1 to work on the valve, the valve is closed and the valve discs 85 are locked in closed position by manipulation of the locks 113. To do this, the cap 125 is unscrewed and the nut 121 is screwed in until the lug 119 easily clears the outer periphery of disc 85. Of course, the operator is working outside the closed casing and does not know the position of lug 119, except that it is far enough in. To swing it so that it engages behind the valve disc 85, he relies on the position of the indicator 123, rotating the shaft 117 until indicator 123 points radially inwardly toward the flow path. He then turns the nut 121 in the opposite direction to unscrew it partially from sleeve 115, until the lug 119 engages firmly behind the valve disc 85, which prevents further rotation of nut 121. The parts then occupy the position of FIG. 7.

When this has been done, the operator can remove the handwheels 25 and 111 and the packing assembly 21, 23, and then remove cover 9 and insert pegs 127 to hold central assemblies 71 in such a position that pilot valves 79 will be kept closed. Screws 77 can then be removed and also screws 131, after which the assembly 11 can be lifted out. It is equally apparent that reassembly will proceed in the reverse sequence.

From a consideration of the foregoing disclosure, therefore, it will be evident that all of the initially recited objects of the present invention have been achieved.

Having described my invention, I claim:

1. A gate valve comprising a valve casing having an inlet and an outlet, a valve head for selectively closing one of said inlet and outlet, means for moving said valve head transverse to the direction of fluid flow through the valve, a valve actuator for moving the valve head parallel to the direction of fluid flow through the valve, rotatable drive means for operating said valve actuator, and a valve stem for rotating said drive means, said valve stem having a noncircular cross-sectional configuration that extends along the valve stem a distance at least equal to the length of said transverse movement of the valve head, said drive means being rotatable with said valve stem and slidable lengthwise along said noncircular portion of said valve stem.

2. A gate valve as claimed in claim 1, said gate valve being bifaced and having a pair of valve heads movable in opposite directions one to open and close said inlet and the other to open and close said outlet, cam means rotatable by said drive means selectively to move said valve heads toward or away from each other, and lost-motion means between said valve heads and said cam means to equalize the force with which each of said valve heads is pressed into closed position.

3. A gate valve as claimed in claim 2, said lost-motion means comprising a floating hollow cam which is elongated in one direction, a noncircular bearing disposed inside said floating hollow cam and mounted for rotation about a fixed axis, said floating hollow cam being slidable on said noncircular bearing only in its direction of elongation, the outer surfaces of said floating hollow cam exerting force on said valve actuator to move said valve heads in a direction to close said valve heads.

4. A gate valve as claimed in claim 3, the outer surfaces of said floating hollow cam being oval.

5. A gate valve as claimed in claim 3, and a pair of cams substantially out of phase with each other and disposed on opposite sides of said floating hollow cam for moving said valve heads toward each other to open the valve.

6. A gate valve as claimed in claim 1, said valve head including a pilot valve, a central assembly in the valve head, means mounting the pilot valve on the central assembly for movement relative to the central assembly to open and close a pilot orifice in the valve head, and means mounting the central assembly in the valve head for movement relative to the valve head, said valve actuator for moving the valve head parallel to the direction of fluid flow being secured to said central assembly so that the pilot valve closes said orifice first and opens said orifice first upon valve-closing and valve-opening movement, respectively.

7. A gate valve as claimed in claim 6, and lock means operable from outside the valve casing for selectively securing the valve head in closed position.

8. A gate valve as claimed in claim 6, and lock means operable from outside the valve casing for selectively securing the valve head in closed position, and releasable detent means for maintaining the pilot valve in closed position.

9. A gate valve as claimed in claim 2, and means for applying valve-opening and valve-closing forces to the valve heads along a common line of thrust, and guide means movable with the valve heads in opposite directions and slidably engaging each other substantial distances on opposite sides of said line of thrust.

10. A gate valve as claimed in claim 9, said guide means comprising a said valve actuator movable with each valve head and engageable through an opening in a said valve actuator movable with the other valve head thereby to provide a pair of slidable connections disposed substantial distances on opposite sides of said line of thrust.

References Cited

UNITED STATES PATENTS

| | | | |
|---|---|---|---|
| 1,141,374 | 6/1915 | Bowen | 251—204 XR |
| 1,559,515 | 10/1925 | Bottner | 137—630.12 |
| 1,705,481 | 3/1929 | Karnath | 251—167 |

FOREIGN PATENTS

| | | |
|---|---|---|
| 1,183,466 | 1/1959 | France. |

WILLIAM F. O'DEA, Primary Examiner

ROBERT G. NILSON, Assistant Examiner

U.S. Cl. X.R.

137—614.21, 630.12, 630.14; 251—167, 187, 197, 204